United States Patent [19]
Sadr et al.

[11] Patent Number: 5,318,740
[45] Date of Patent: Jun. 7, 1994

[54] EXTRUSION BLOW MOLDING AN AUTOMOTIVE BOOT

[75] Inventors: Changize Sadr, Toronto; Danny Cacciacarro, Mississauga, both of Canada

[73] Assignee: ABC Group, Rexdale

[21] Appl. No.: 994,350

[22] Filed: Dec. 21, 1992

[51] Int. Cl.$^5$ .................. B29C 49/04; B29C 49/18
[52] U.S. Cl. .................... 264/506; 264/529; 264/533; 425/525; 425/535
[58] Field of Search ............ 264/505, 506, 507, 523, 264/529, 531, 533, 540; 425/525, 532, 535

[56] References Cited

U.S. PATENT DOCUMENTS

| | | | |
|---|---|---|---|
| 3,271,489 | 9/1966 | Fogelberg et al. | 264/529 |
| 3,371,376 | 3/1968 | Fischer et al. | 264/529 |
| 3,410,937 | 11/1968 | Winchester | 264/529 |
| 4,049,762 | 9/1977 | Martino et al. | 264/506 |
| 4,334,852 | 6/1982 | Haubert | 264/533 |
| 4,396,574 | 8/1983 | Kovacs | 264/533 |
| 4,442,063 | 4/1984 | Younkin et al. | 264/533 |
| 4,518,558 | 5/1985 | Anway et al. | 264/533 |
| 5,112,561 | 5/1992 | Dickinson | 264/533 |

FOREIGN PATENT DOCUMENTS

| | | | |
|---|---|---|---|
| 60-217127 | 10/1985 | Japan | 264/506 |
| 1241425 | 9/1989 | Japan | 264/540 |

Primary Examiner—Catherine Timm
Attorney, Agent, or Firm—George A. Seaby

[57] ABSTRACT

In general, it is difficult to mold properly sized automotive boots without flash to be removed from the top end thereof. In accordance with the present invention, such molding is achieved placing a tubular parison between a pair of mold halves, moving a blow pin assembly downwardly partly into the top end of the parison, closing the mold by moving the mold halves together, using fingers to stretch the open bottom end of the parison, moving a sizing mandrel into the bottom end of the parison, closing inserts on the bottom of the mold around the bottom end of the parison to size the latter, blowing the parison using air under pressure discharged from the blow pin, moving the blow pin assembly farther down into the parison to size and cut the top end of the parison, opening the inserts and removing the lower sizing mandrel, opening the mold, closing the stretching fingers, and removing the blow pin assembly from the boot, which is stripped from the mold.

4 Claims, 4 Drawing Sheets

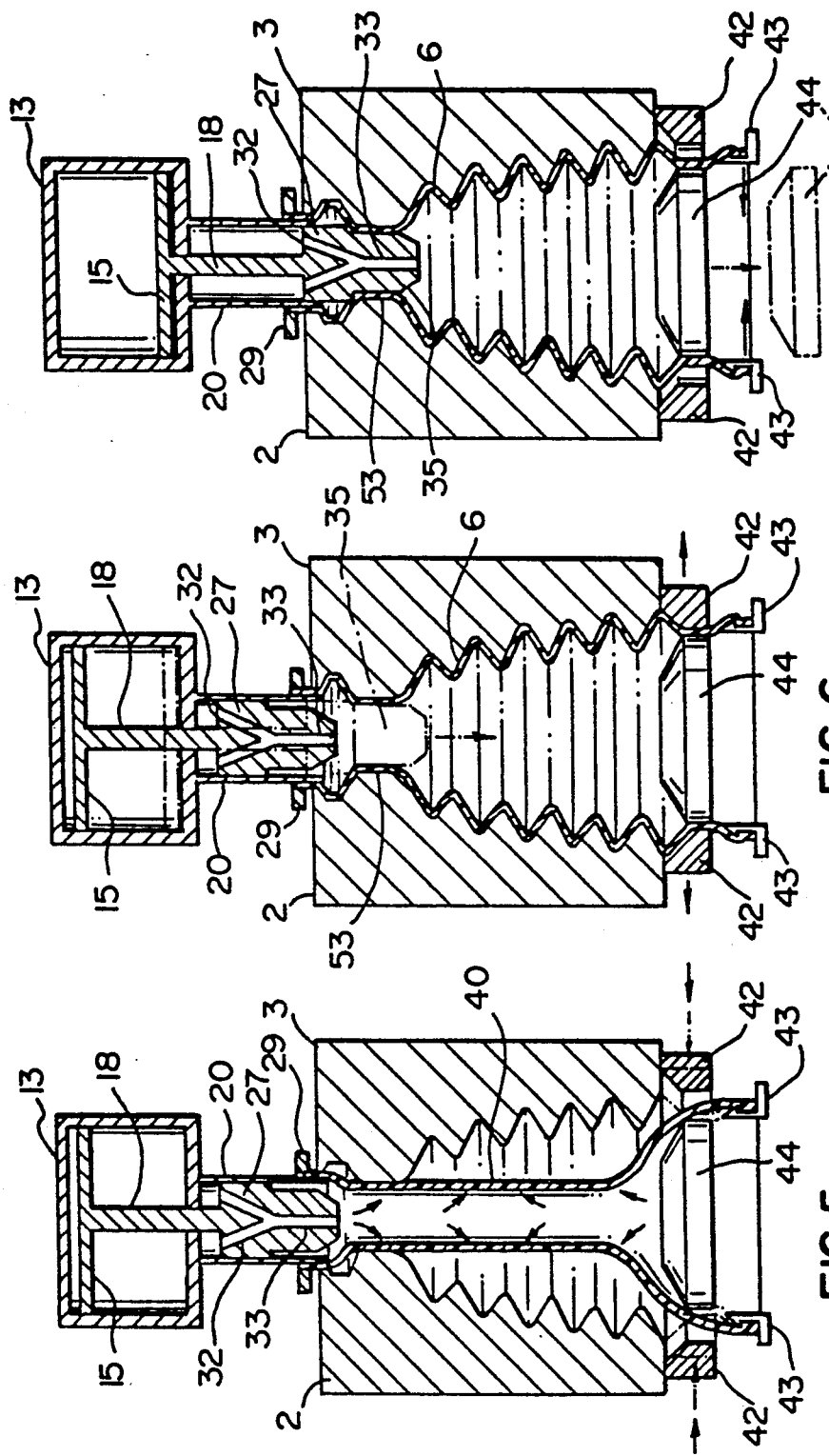

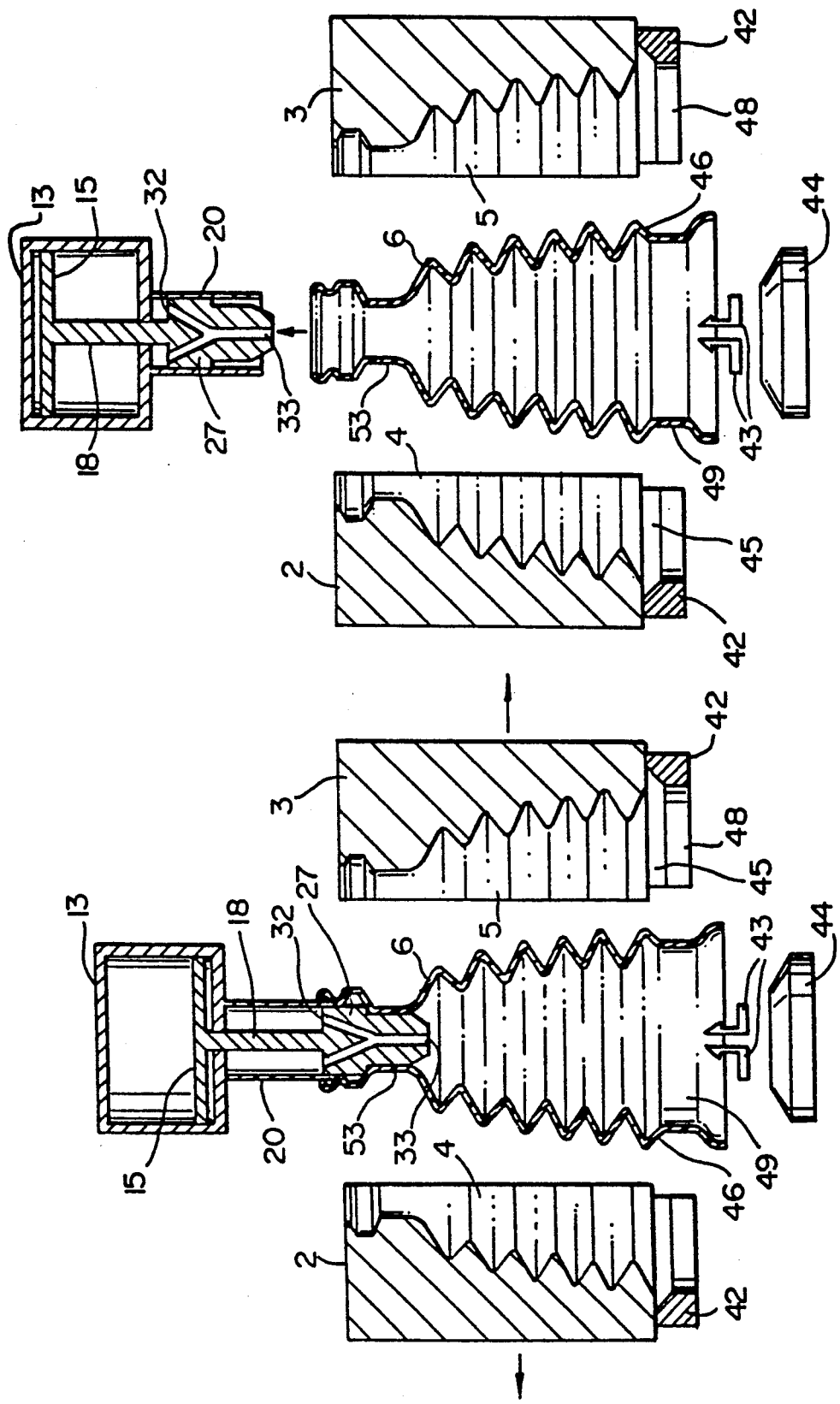

EXTRUSION BLOW MOLDING AN AUTOMOTIVE BOOT

BACKGROUND OF THE INVENTION

1. Field of the Invention

This invention relates to a method and apparatus for blow molding a hollow body, and in particular to a method and apparatus for blow molding an automotive boot.

2. DISCUSSION OF THE PRIOR ART

Automotive boots for covering grease coated joints generally include a bellows-shaped body and cylindrical sleeves or collars at each end of the body for mounting the boot on automotive components. A problem inherent to the production of such boots is the formation of a generally cylindrical sprue or flash which must be removed from the boot in labour intensive finishing operations.

GENERAL DESCRIPTION OF THE INVENTION

The object of the present invention is to provide a relatively simple method and apparatus for producing an automotive boot without a flash.

According to one aspect, the invention relates to a method of molding an automotive boot of the type including a bellows-shaped body and a pair of end collars for mounting the boot on automotive components, said method comprising the steps of extruding a parison; moving said parison into an open mold; introducing a blow pin assembly into the open top end of the parison to hold the top end of the parison open; closing the mold around the parison and sleeve; stretching the bottom end of the parison open; inserting a mandrel into the open bottom end of the parison; introducing air under pressure into the parison to preblow the latter; compressing the bottom end of the parison against said mandrel to form a first said collar; moving a blow pin into the open top end of the parison to press the top end of the parison against the mold to size the second said collar and to separate the top end of the parison therefrom; and introducing air under pressure through said blow pin into the parison to blow the latter against the mold to form the body of the boot between said first and second collars.

BRIEF DESCRIPTION OF THE DRAWINGS

The invention will be described in greater detail with reference to the accompanying drawings, which illustrate a preferred embodiment of the invention, and wherein:

FIGS. 2 to 9 are schematic, longitudinal sectional views of the apparatus of FIG. 1 in a variety of molding conditions.

DESCRIPTION OF PREFERRED EMBODIMENT

Figure 1:
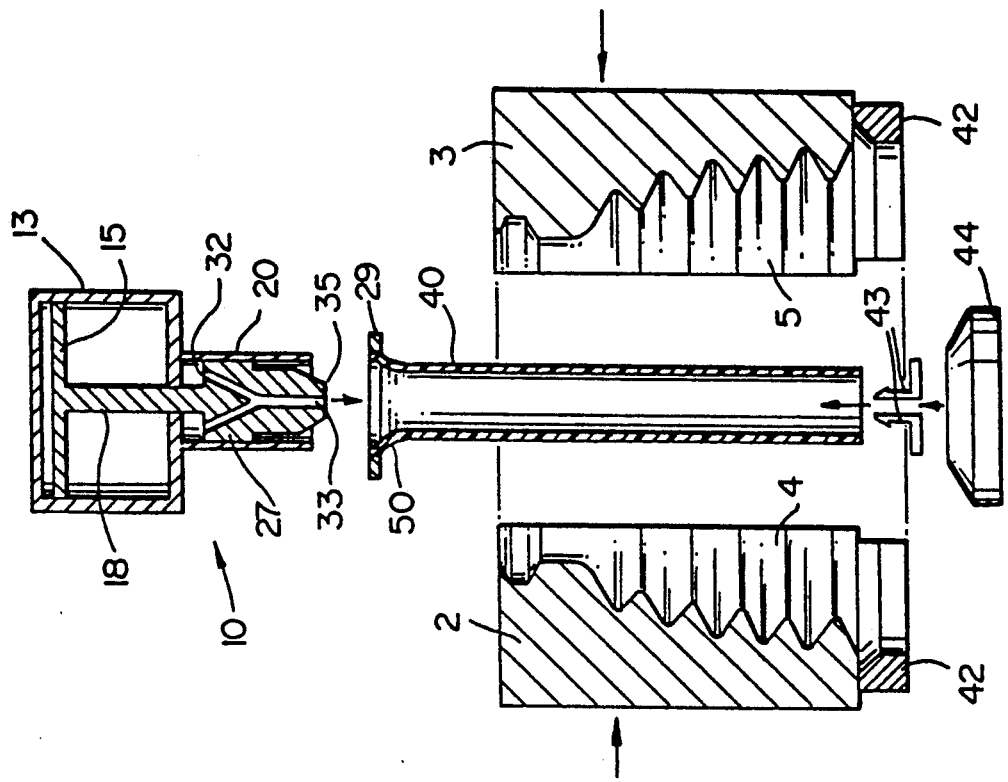
FIG. 1 is a schematic, longitudinal sectional view of the top portion of an apparatus for effecting a method of the present invention.
Figure 2:
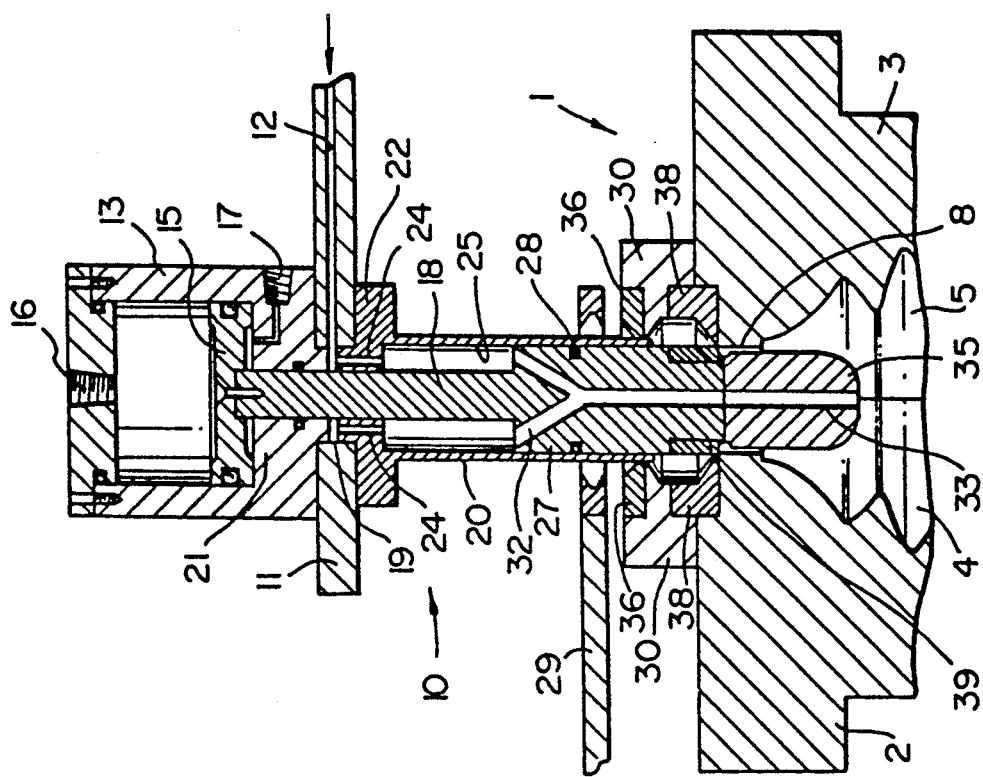
Figure 3:
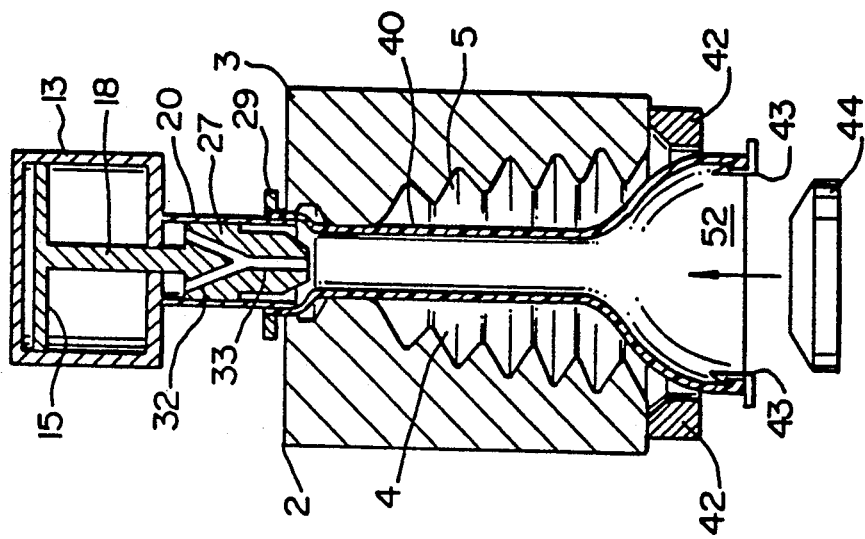

With reference to FIG. 1, an apparatus for carrying out the method of the present invention includes a mold generally indicated at 1 defined by a pair of mold halves 2 and 3. The mold halves contain recesses 4 and 5, which together define a mold cavity in the shape of a boot 6 (FIGS. 6 to 9) when the mold is closed (FIG. 1).

The cylindrical top end 8 of the mold cavity is closed by a blow pin assembly generally indicted at 10. The assembly 10 includes an arm 11 supporting the assembly and containing a passage 12 for introducing air under pressure into the assembly. A pneumatic cylinder 13 is carried by the arm 11. A piston 15 is caused to reciprocate in the cylinder 13 by air entering and leaving the cylinder via openings 16 and 17 above and below the piston. A blow pin 18, which is connected to the piston 15 extends downwardly through an opening 19 in the arm 11 and through a sleeve 20. The lower end 21 of the cylinder 13 and the closed upper end 22 of the sleeve 20 and the opening 19 in the arm 11 define an air receiving chamber. Air entering the chamber is discharged via openings 24 in the upper end 22 of the sleeve 20 into a chamber 25 between the rod 18 and the sleeve 20. The large body 27 of the pin 18 is slidable in the sleeve 20, with an 0-ring 28 therebetween for sealing purposes.

During use, the pin 18 and the sleeve 20 extend downwardly through a parison carrier arm 29 and mold inserts 30 into the open top end 8 of the mold cavity. Air passages 32 and 33 in the body 27 and head 35, respectively of the pin 18 carry air to the mold cavity during a blow molding operation.

The inserts 30 are blocks mounted on the top of the mold halves 2 and 3. Semicircular recesses in the inserts 30 define a circular opening when the mold is closed for receiving the pin 18 and the sleeve 20. Striker plates 36 are provided in the top of each insert 30 for engaging and centering the bottom end of the sleeve 20, i.e. the plates 36 ensure that the sleeve 20 and the blow pin 18 are accurately centered in the mold. Striker plates 38 are mounted in opposed recesses in the top of the mold halves 2 and 3, and in the bottom of the inserts 30. The striker plates 38 have a sharp bottom inner edge for cooperating with a cylindrical cutting sleeve 39 on the pin 18 for cutting a parison 40 (FIGS. 2 to 5).

As shown in FIGS. 2 to 9, the elements defined above are used in combination with a pair of sliding inserts 42 on the bottom of the mold halves 2 and 3, stretcher fingers 43 and a sizing mandrel 44 to form a boot 6. The inserts 42 and the stretcher fingers 43 are designed and operate in the manner described in detail in U.S. Pat. No. 4,396,574, issued to S. A. Kovacs on Aug. 2, 1983. In general terms, the fingers 43 are slidably mounted in a block for radially moved toward and away from the longitudinal axis of the mold cavity. The sizing mandrel 44 is mounted on the top end of a piston/cylinder arrangement (not shown) for vertical movement along the longitudinal axis of the mold cavity. The inserts 42 include an inclined upper, inner surface 45 designed to form the bottom end 46 (FIGS. 8 and 9) of the bellows portion of the boot 6, and a cylindrical lower, inner surface 48 which cooperates with the mandrel 44 in forming and sizing the cylindrical collar portion 49 of the boot 6.

The method of the present invention will be described with specific reference to FIGS. 2 to 9. With the mold sides 2 and 3 separated, i.e. with the mold 1 open, the blow pin assembly 10 is off to one side, the sizing mandrel and stretcher fingers are below the mold, and the sliding inserts are in their outermost position. A parison 40 carried by the arm 29 is placed between the mold halves 2 and 3, and the fingers 43 and the mandrel 44 are moved upwardly to position the fingers in the bottom end of the parison 40. The blow pin assembly 10 is moved into position above the center of the mold 1.

Figure 4:
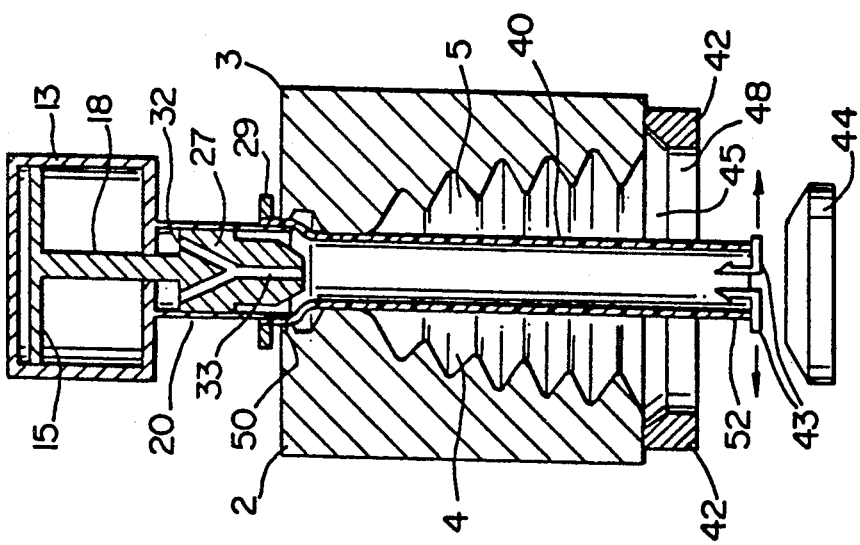

The mold 1 is closed by moving the mold halves 2 and 3 together. A fraction of a second before the mold closes the sleeve 20 of the assembly 10 is introduced into the flared open top end 50 (FIG. 3) of the parison 40. The fingers 43 are moved radially apart to stretch the bottom end 52 (FIG. 3) of the parison 40 so that the sizing mandrel 44 can be introduced into such bottom end 52 (FIG. 4).

Air under pressure is introduced into the parison 40 to preblow the latter, and the sliding inserts 42 are moved together against the bottom end 52 of the parison 40 to size the bottom end (FIG. 5). Blowing of the parson 40 is effected to form the boot 6. The head 35 of the blow pin 18 defining an upper sizing mandrel is moved downwardly into the top of the boot 6 to compress, i.e. size the neck 53 of the boot 6 (FIG. 6) in a flashless manner. During such sizing, the sleeve 39 (FIG. 1) cuts the top end of the boot, removing the tops of the parison therefrom.

With the formation of the boot 6 completed, the lower inserts 42 spread apart, i.e. opened and the mandrel 44 is removed from the boot 6 (FIG. 7). The fingers 43 move together or close and the mold 1 opens (FIG. 8). The blow pin assembly 10 is stripped from the boot 6 by moving the piston 15 upwardly in the cylinder 13 (FIG. 9), and the assembly is moved to one side so that a fresh parison 40 can be introduced to start the process again.

In an alternate method, following movement of the parison 40 between the mold halves 2 and 3 (FIG. 2), the blow pin assembly 10 is moved downwardly into the top end of the parison 40 (FIG. 3) and the mold 1 is closed by moving the mold halves 2 and 3 together.

The fingers 43 are moved apart or opened to stretch the bottom end of the parison 40, and the sizing mandrel 44 is moved upwardly into the open bottom end of the parison 40. The inserts 42 at the bottom of the mold are then closed to size the bottom end 52 of the parison 40, and the parison 40 is blown, i.e. air under pressure is introduced into the parison 40 via the blow pin assembly 10. The blow pin assembly 10 is moved downwardly into the parison 40 to size the top end 50 thereof, i.e., the cutting insert 39 and the striker plate 38 cooperate to cut the parison 40 while the head 35 sizes the neck of the boot 6. The sliding inserts 42 are opened, and the head 35 defining the lower sizing mandrel 44 is moved downwardly. The mold 1 is opened, the fingers 43 are closed, and the blow pin assembly 10 is stripped from the boot 6, which is then removed from the machine to complete the operation.

In FIGS. 8 and 9, the top end of the boot neck 53 is shown as having a concavo-convex cross section. This shape, which is not shown in FIGS. 3 to 7, is caused by the concave annular groove (FIG. 1) in the arm 29. The remaining views 2 to 7 are quite schematic and accurately illustrate neither the structure at the top of the mold shown in FIG. 1 nor the shape of the top end of the parison during molding.

It will be appreciated that the method and apparatus described above can be used to produce other boots and similar articles of manufacture.

We claim:

1. A method of molding an automative boot including a bellows-shaped body and a pair of end collars for mounting the boot on automotive components, said method comprising the steps of extruding a parison; moving said parison into an open mold; introducing a blow pin assembly including a blow pin in a sleeve into the open top end of the parison, whereby the sleeve opens the top end of the parison and holds said top end of the parison open; closing the mold around the parison and sleeve; stretching the bottom end of the parison open; inserting a mandrel into the open bottom end of the parison; introducing air under pressure through the blow pin into the parison to pre-blow the latter; sliding bottom inserts against the bottom end of the parison to compress the parison against said mandrel to form a first said collar; moving the blow pin in the sleeve into the open top end of the parison to press the top end of the parison against the mold to size the second said collar and to cut the top end of the parison away from said second collar; and introducing air under pressure through said blow pin into the parison to blow the latter against the mold to form the body of the boot between said first and second collars.

2. A method according to claim 1, wherein the boot is removed from the mold by withdrawing said mandrel form the bottom of the boot; releasing the stretched bottom end of the boot; opening the mold; and withdrawing the blow pin assembly from the top end of the boot to release the latter.

3. A method of molding an automotive boot including a bellows-shaped body and a pair of end collars for mounting the boot on automotive components, said method comprising the steps of extruding a parison; moving said parison into an open mold; introducing a blow pin assembly including a blow pin in a sleeve into the open top end of the parison to hold the top end of the parison open; closing the mold around the parison and sleeve; stretching the bottom end of the parison open; inserting a mandrel into the open bottom end of the parison; sliding bottom inserts against the bottom end of the parison to compress the parison against said mandrel to form a first said collar; introducing air under pressure through the blow pin into the parison to blow the latter against the mold to form the boot; moving the blow pin downwardly in the sleeve into the open top end of the parison against the mold to size the second said collar and to cut the top end of the parison away from said second collar.

4. A method according to claim 3, including the steps of opening the mold; releasing the first collar of the boot, removing the blow pin assembly from the top of the boot, and stripping the bottom from the mold.

* * * * *